April 20, 1926.

W. E. REED 1,581,868

ELECTRIC WELDING MACHINE

Filed Dec 28, 1923  6 Sheets-Sheet 1

INVENTOR
William Edgar Reed
By Kay, Totten & Brown,
Attorneys.

April 20, 1926.

W. E. REED 1,581,868

ELECTRIC WELDING MACHINE

Filed Dec. 28, 1923   6 Sheets-Sheet 5

INVENTOR
William Edgar Reed
By Kay, Totten & Brown,
Attorneys.

April 20, 1926.

W. E. REED

ELECTRIC WELDING MACHINE

Filed Dec. 28, 1923 6 Sheets-Sheet 6

1,581,868

INVENTOR
William Edgar Reed
By Kay, Totten & Brown
Attorneys

Patented Apr. 20, 1926.

1,581,868

UNITED STATES PATENT OFFICE.

WILLIAM EDGAR REED, OF PITTSBURGH, PENNSYLVANIA.

ELECTRIC WELDING MACHINE.

Application filed December 28, 1923. Serial No. 683,184.

*To all whom it may concern:*

Be it known that I, WILLIAM EDGAR REED, a citizen of the United States, and resident of Pittsburgh, in the county of Allegheny and State of Pennsylvania, have invented a new and useful Improvement in Electric Welding Machines; and I do hereby declare the following to be a full, clear, and exact description thereof.

My invention relates to electric welding machines and has special reference to machines for welding crossed wires, rods or strips, as in the manufacture of welded fabrics for fencing and concrete reinforcement, or for other similar purposes.

One object of my machine invention is to provide an improved welding machine of simple and rugged construction, wherein the current and pressure necessary for welding may be supplied by means of rotary rolling electrodes.

Another object of my invention is to provide a machine of the character indicated, provided with improved means for automatically depositing the cross or stay-wires in cooperative relation to longitudinally moving strand-wires and for maintaining them in proper position thereon.

A further object of my invention resides in arranging the electrodes upon one side of the fabric transversely of the fabric in such manner that the individual welding units may be made sufficiently large without crowding, and in supporting said electrodes at different points longitudinally of the fabric being welded, so as to reduce the peak-load of the current required by reason of the fact that all points on a given stay-wire are not welded simultaneously.

A further object is to provide means for insuring effective engagement between the electrodes and the wire being welded, through the provision of means compensating for irregularities in diameters of wire or vertical displacement of the supporting bed for the fabric.

Another object resides in the provision of means whereby wires, rods, bars, etc. of widely differing thickness may be welded without materially changing the apparatus, and whereby fabric of substantially any width may be formed.

Another object is to provide a high speed continuously operating welding machine simple in construction and effective in operation.

Another object resides in the provision of an improved control mechanism for the supply of current to the transformer.

Still another object is to simplify and improve generally the construction and operation of machines of this character.

My machine consists, in general, of two or more endless chains mounted on sprocket wheels with the upper runs of the chains horizontal or inclined at a small angle to the horizontal and having the transversely aligned links of the respective chains connected by cross-bars or welding-bars which have a notch or other means for positioning a stay-wire thereon, and for assisting the stay-wire to advance with the chain welding-bar. This construction forms a flexible moving table of transversely extending electrodes that carries cross or stay-wires under rolling electrodes where the stay-wires are welded to the strand-wires that are fed under the rolling electrodes between the stay-wires and the rolling electrodes. The rolling electrodes are grooved so as to assist in guiding the strand-wires and holding them in position as they are fed between the electrodes.

The stay-wires are deposited on the welding-bar of the endless table by suitable automatic means, and are advanced into contact with the strand-wires, whereupon the strand-wires and stay-wires are welded together by means of the cooperating electrodes. The fabric is advanced continuously past the welding positions, either by means of the table or additional feeding means, and the electrodes are provided with suitable means for completing the electric circuit through them as each stay-wire arrives at the welding position.

One form which my invention may take is shown in the accompanying drawing, wherein—

Figure 1:
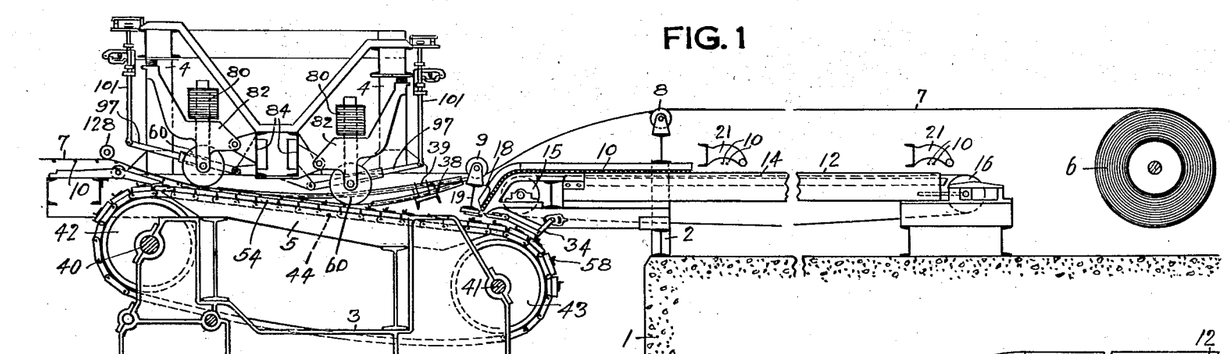
Fig. 1 is a view, partially in side elevation and partially in section, of apparatus embodying my invention.

Referring more particularly to Fig. 1, I provide a foundation 1 for supporting the framework of the apparatus. The framework 2 supports the mechanism for feeding the stay-wires which extend transversely of the machine, and the framework 3 supports the welding machine proper. The frame 3 is provided with upright members 4 and supports a bedplate 5.

A number of spools 6, corresponding to the number of strands of wire desired, are mounted at one end of the machine and the strands 7 (in the present case 24—Fig. 6), are drawn therefrom over grooved guide-rollers 8, and under grooved rollers 9, to the welding machine, in a manner hereinafter described.

Figure 6:
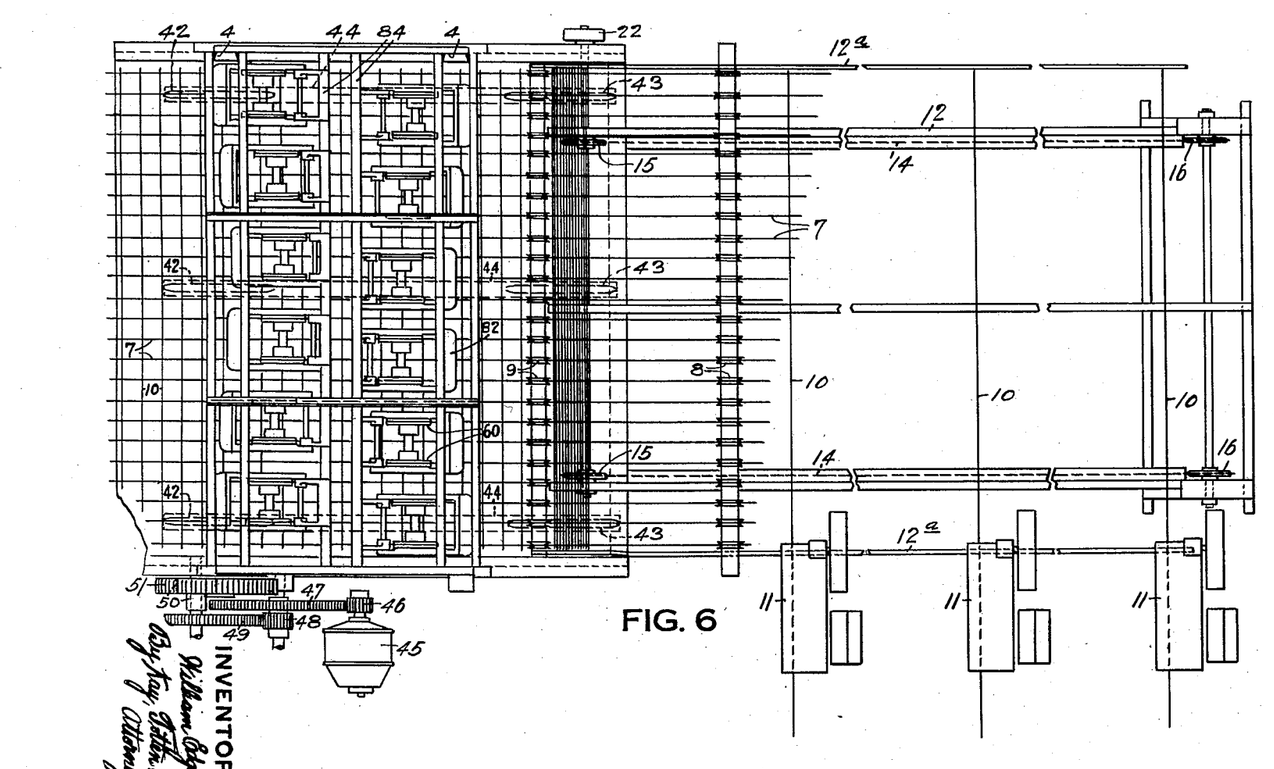
Fig. 6 is a plan view of apparatus for feeding the stay-wires.

Referring more particularly to Fig. 6 the stay-wires 10 which are to be welded to the strands 7 are fed through straightening devices 11 which may be of conventional form, in any desired manner, and sheared to the proper length by a cutting off device, (not shown), which may constitute a part of the straightening machine. In order that both ends of the stay-wires 10 may be simultaneously engaged by the carrier mechanism on the feed table 12, their forward ends are moved outwardly previous to shearing. After shearing the wires they are automatically dumped on the table by dumping mechanism represented at 21, (Fig. 1) which mechanism may be of conventional form and caused to operate when one or more wires have been deposited thereon. The stay-wires when sheared rest upon the feed-table 12 (Fig. 2) above which project dogs 13 carried by a chain 14 which passes around the sprocket-wheels 15 and 16. The sprocket-wheels are driven from any desired source of power through a pulley 22 (Fig. 6) which may be connected to the main driving mechanism, to be hereinafter described. End guides 12ª are provided for maintaining the stay-wires 10 in proper position upon the table 12 as they are moved forward by the feeding mechanism. As the chain moves around the sprockets 15 and 16 in a counter-clockwise direction, the fingers 13 pick up the stay-wires 10 and moves them forwardly in the manner shown in Fig. 2, forcing them downwardly in the chute whose sides are adjustable to varying thicknesses of wire. The stay-wires 10 lie in one side of an inclined chute 17 and are pressed thereagainst by means of the spring-finger 18 which is supported upon a cross-beam 19 that is fastened to the table 2. When the chute 17 becomes partially filled the dogs yield about their pivots, against the tension of their springs 13ª, to permit them to pass the stay-wires which have been carried to the front of the table 12.

In order to feed the stay-wires 10 to the welding mechanism in definite relation to the movement of such mechanism, I provide a supporting device consisting of a member 30 slidably supported for movement longitudinally of the apparatus, and provided with a shelf-member 31 and a blade member 32. The rear end of the blade 30 is attached to a link 33 that is pivotally connected to a lever 34 which is in turn pivotally supported from a rotatably adjustable plate 35. A spring 36 tends to hold the shelf-member 31 in position to support the stay-wires 10. When the slide 30 is advanced against the tension of the spring 36 the forward edge of the plate-member 32 enters between the lowermost stay-wire and the one immediately above it, to support those stay-wires located thereabove, while the shelf 31 moves forwardly with the slide to permit the lowermost stay-wire to fall to the carrier therebeneath. Yielding fingers 20 (Fig. 3) hold the stay-wires 10 firmly in position on the carrier.

Figure 3:
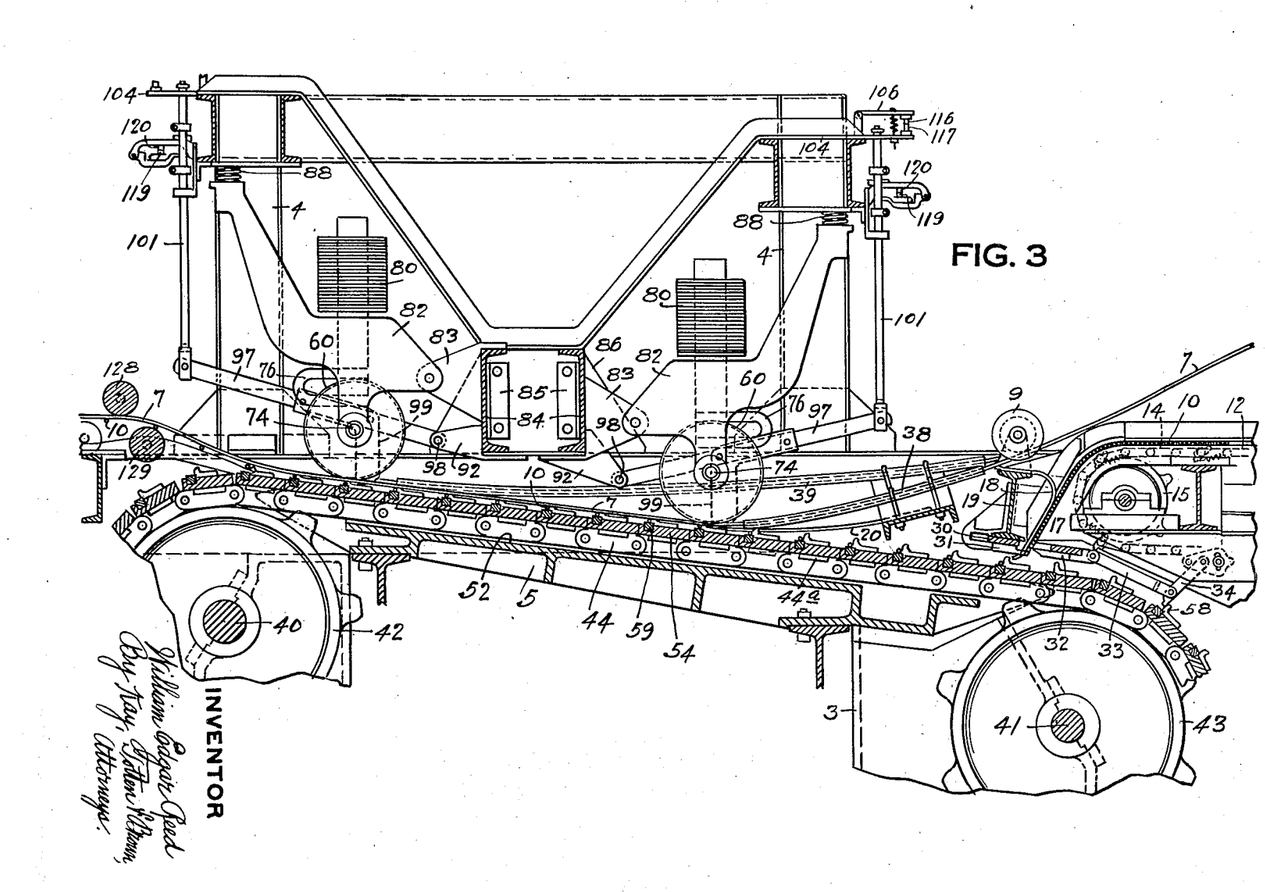
Fig. 3 is a view similar to Fig. 2, but showing more of the details.

The mechanism for welding the stay-wires 10 to the strand-wires 7 will now be described; reference being first had more particularly to the apparatus shown in Fig. 3.

The strands 7 being drawn from spools 6 pass through tubular members 38 and 39 that serve as guides for the strands, one-half of the strand wires passing through the tubes 39 and the other half, which alternate therewith transversely, pass through the tubes 38, the first named series of wires being engaged by the rear set of electrodes to be hereinafter described and the strands passing through the tubes 38 being operated upon by the forward set of electrodes.

Mounted in the framework 3 (Figs. 3 and 6) are shafts 40 and 41 that carry sprocket-wheels 42 and 43 (Figs. 3 and 6) around which chains 44 pass. The shaft 40 is driven by a motor 45, through pinion 46, gear-wheel 47, pinion 48, gear-wheel 49, pinion 50 and a gear-wheel 51.

Figure 2:
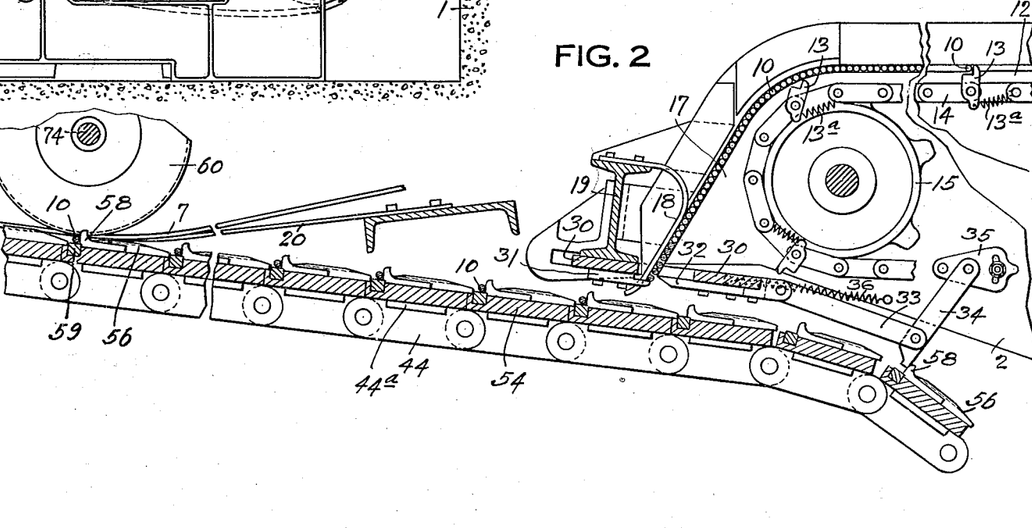
Fig. 2 is an enlarged detail view of a portion of the apparatus of Fig. 1 with some of the parts omitted.
Figure 5:
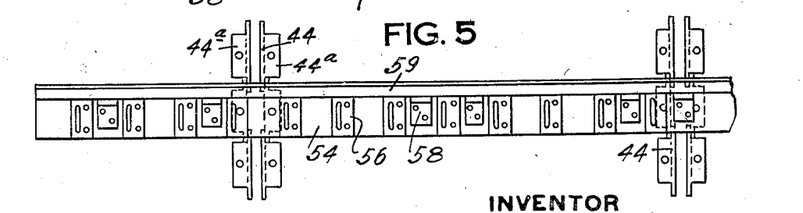
Fig. 5 is a plan view of a portion of the apparatus of Fig. 4, with some of the parts omitted.
Figure 7:
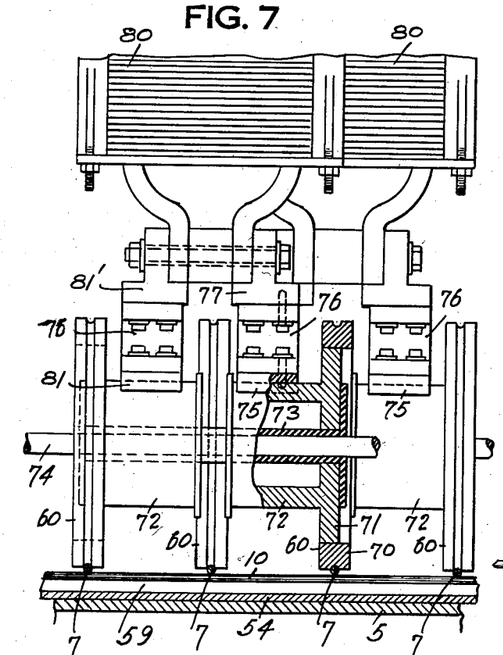
Fig. 7 is an end elevational view, partially in section, showing the manner in which the electrodes are mounted.
Figure 8:
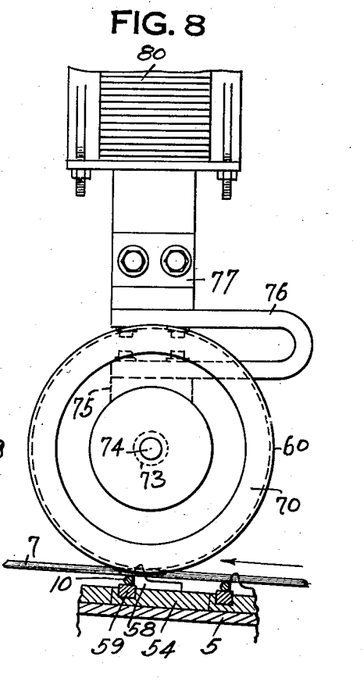
Fig. 8 is a side elevational view of the apparatus of Fig. 7.

The lower edges of the chains 44, in their upper runs lie in grooves 52 formed in the upper surface of the bed-plate 5 to serve as guides for the chains, and to permit the bars 54 to lie flat on the bed-plate 5, between the grooves so they may withstand the welding pressure of the upper electrodes without deflection. Each link of the chains 44 is provided with a pair of wings 44ª, (Fig. 5) to which are fastened anvil-bars 54 that extend transversely of the machine (Figs. 2, 7 and 8).

A series of guide-blocks 56, preferably of insulating material such as fibre, are mounted upon each anvil-bar 54, such blocks being spaced longitudinally of the bars and transversely of the machine a distance corresponding to the distance between the strand-wires 7. The blocks 56 are provided with longitudinal grooves for the reception of the strand-wires 7, to hold such wires against displacement transversely of the machine.

Also fastened to each of the anvil-bars 54 are a series of lugs 58 that are spaced longitudinally of said bars and transversely of the machine. These lugs engage lever 34 (Fig. 2) to count off the strand-wires 10 and cause them to fall upon the carrier in the manner above described at a predetermined point relative to the lug 58 and bar 59 nearest thereto. The chain-runs between the sprocket-wheels 42 and 43 are preferably slightly inclined so that the stay-wires 10 will more readily lie in position against the lugs 58.

The electrode bars 59 (Figs. 2 and 9) are set within slots in the anvil-bars 54 and extend substantially the full width of the machine. These bars 59 are preferably of copper and constitute the bottom electrodes.

Figure 4:
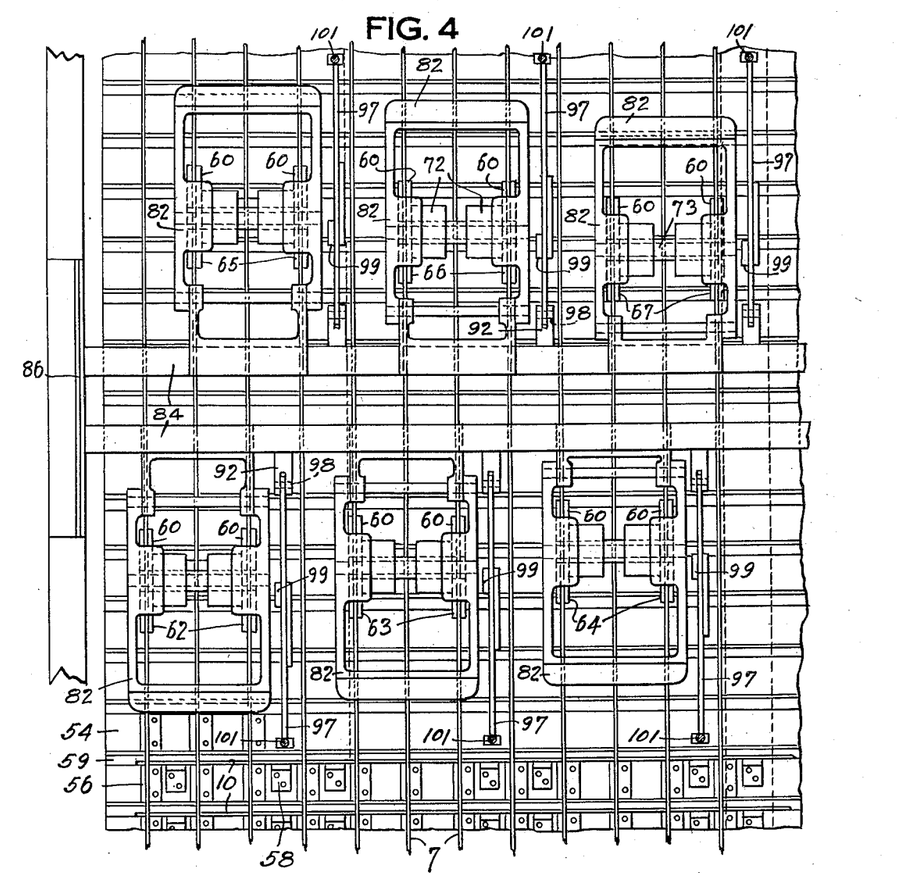
Fig. 4 is a plan view of a portion of the apparatus of Fig. 1.

The upper electrodes 60 are in the form of grooved rollers (Figs 7 and 8). These rollers are divided into two sets, one set being mounted forwardly of the other set. The rear set consists of rollers three pairs of which are shown in Fig. 4 and designated as 62, 63 and 64, and forwardly of these are shown three pairs numbered 65, 66 and 67.

Figures 12, 13, 14:
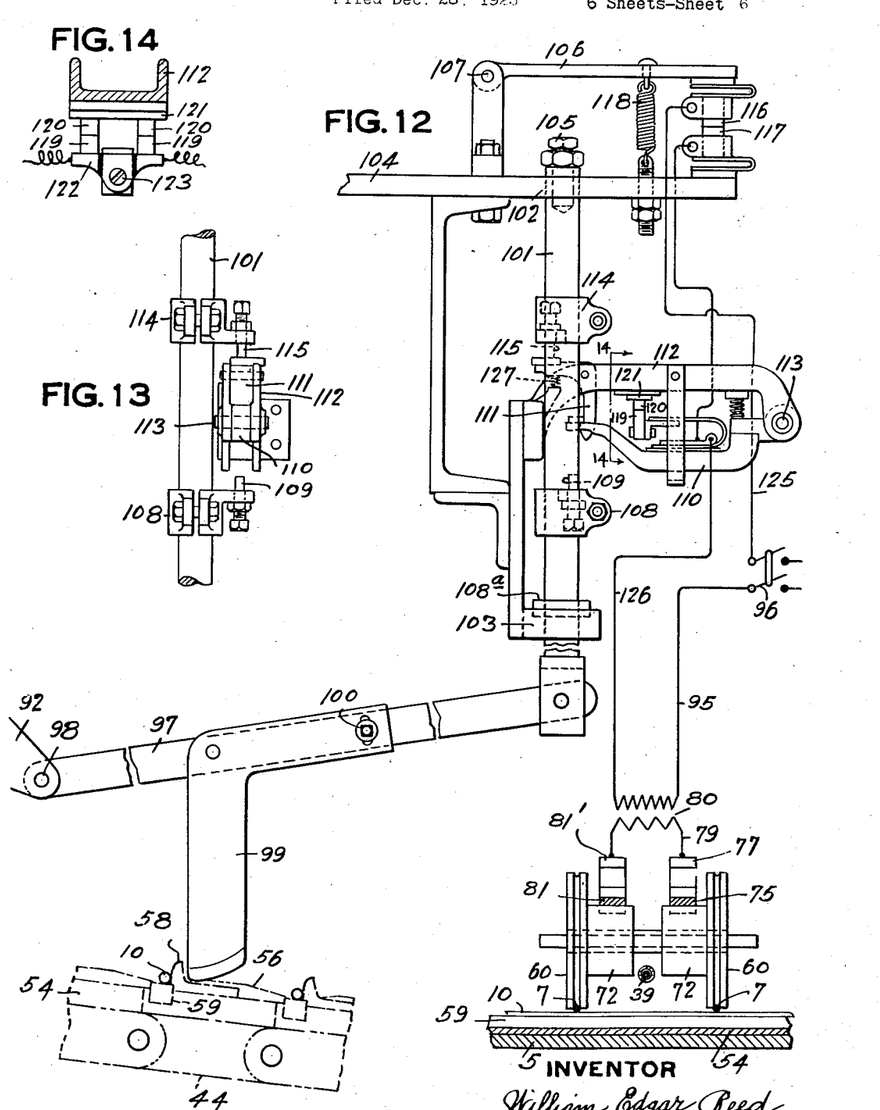
Fig. 12 is a view showing the circuit arrangements of the transformers and the manner in which the primary circuit of the transformer is controlled.
Fig. 13 is a view showing a portion of the apparatus of Fig. 12, looking from the right.
Fig. 14 is a view taken on a line 14—14 of Figure 12.

Referring now to Figs. 7 and 8, the electrodes 60 are provided with the rim portion 70 to which is secured, by shrink fit or otherwise, a body-member 71. This construction permits easy and cheap replacement of the rim 70 as they become worn. A hub-member 72 is secured to the member 71, by welding or otherwise, the members 70, 71 and 72 being made preferably of copper or other good conducting material and may be integral. A sleeve 73 of insulating material is rigidly secured to the rotating electrode 60 and is rotatably supported upon a shaft 74, each of the pairs of electrodes shown in Fig. 4 being provided with a shaft 74 supported in rocking-frames 82 (Fig. 3). Brush-members or shoes 75 engage the hubs 72 and each brush-member is supported by a yielding conductor 76 whose opposite ends are respectively bolted to the brush 75, and a block 77 that constitutes one terminal of the secondary circuit 79 of a transformer 80 (Fig. 12). The other electrode 60 of each pair of electrodes is provided with a brush-member 81 supported from a terminal block 81' corresponding to the block 77 and forming the other terminal of the secondary circuit. The hub-members 72 of the respective pairs of electrodes are spaced or otherwise insulated from one another.

Each of the electrode shafts 74 is supported in a rocking-frame 82 (Fig. 3) that is pivotally supported by wings 83 which are secured to channel-members 84 supported by ears 85 that are attached to end-plates 86 of the framework of the machine. The outer ends of the rocking-frame 82 are biased downwardly by adjustable springs 88, so that the electrodes 60 are yieldingly held against the table and the welding pressure may be varied to suit conditions. The pivotal connections between the rocking-frames 82 and the wings 83 are loose so that each pair of electrodes may rock so that one electrode will not be held out of engagement with the wires beneath it when the other electrode encounters a wire of abnormal thickness. When the strands 7 emerge from the forward ends of the guide pipes 38 and 39, which are alternately spaced transversely of the machine, the wires that emerge from the pipes 39, pass under the rear set of electrodes 62, 63 and 64 at which point they are welded to the strand-wires 10 as will be hereinafter described. The pipes 38 extend forwardly to a point adjacent to the forward set of electrodes to insure that the strand-wires passing therethrough will be properly engaged by the forward sets of electrodes 65, 66 and 67.

The roller-electrodes 60 are rotated by reason of their frictional engagement with the driven portions of the apparatus upon which they rest. Electric current may be supplied to the primary circuit 95 (Fig. 12) of the transformer from any desired source, through a circuit controlled by a switch 96. In order to avoid unnecessary consumption of current automatic mechanism is provided for opening and closing a circuit-breaker in timed relation to the movement of the welding apparatus. The automatic circuit-breaker mechanism consists of a lever 97 pivoted at 98 to the members 92 (Figs. 3 and 12). A bell-crank lever 99 is pivotally supported by the lever 97, its rocking movement with respect thereto being limited by the pin and slot connection 100. The outer end of the lever 97 is pivotally connected to an operating rod 101 which is slidable vertically in guide-ways 102 and 103 that are supported from an extension 104 of the main frame. The upper end of the rod 101 is provided with an adjustable abutment 105 that raises a contact carrier 106 pivotally supported at 107, when the rod 101 moves upwardly. A clamp 108 is rigidly secured to the rod 101 and is provided with an adjustable stop member 109 which, upon upward movement, engages a contact-arm 110 and moves it into locking engagement with a latch 111 that is pivotally supported from a contact-arm 112. The contact-arm 110 is pivotally supported at 113. A clamp 114 is rigidly secured to the rod 101 and is provided with an adjustable stop member 115 that trips the latch 111 to release the contact arm 110, when the rod 101 moves down.

The arm 106 carries a contact 116 that cooperates with a yieldingly supported contact member 117, the contacts being normally held closed by a spring 118.

The arms 110 and 112 are each provided with a pair of contacts 119 and 120 respectively (Fig. 14), the contacts 120 being supported from a conducting bar 121 and the contacts 119 being insulated from one another, as shown in Fig. 14. The bar 122 upon which the contacts 119 are mounted has slight rocking movement about a pivot 123, so as to permit it to adjust itself to irregularities as between the contacts 119 and 120.

The circuit from one side of the switch 96 through the primary circuit 95 of the transformer may be traced as follows: The conductor 125, through contacts 116 and 117 to one of the contacts 119, thence through the contacts 120 and the other contact 119, and conductor 126, back to the switch 96.

The circuit-breaker mechanism just described is actuated by the lever 99 which is engaged by a lug 58 each time one of the stay-wires 10 reaches a position beneath a pair of electrodes 60. One circuit-breaker is provided for each pair of electrodes 60. When a lug 58 engages the lever 99 such lever is turned slightly in a clockwise direction, for a distance determined by the pin and slot connection 100, and is elevated to raise the lever 97 and the rod 101. As the rod 101 rises the abutment 105 engages the arm 106, separating the contacts 116 and 117. A slight further movement effects engagement between the abutment 109 and the contact arm 110 to close the circuit through the contacts 119 and 120, such contacts being held closed by the latch 111, as above explained.

When the lug 58 has passed from beneath the lever 99, the rod 101 is permitted to fall. This downward movement causes the contacts 116 and 117 to again close, thus completing the primary circuit of the transformer, which circuit remains closed until the rod in falling carries the stop member 115 into engagement with the latch 111 to trip the same and permit the contacts 119 to move out of engagement with the contacts 120. Counter-clockwise movement of the latch 111 is cushioned by the spring member 127. The clamp 108 engages a cushion 108ª on the guide 103, to limit downward movement of the rod 101. It will be seen that the circuit is closed only during the time required for the rod 101 to fall from a point near its uppermost position to a point adjacent to its lowermost. The current thus flows for a very brief period but for a time sufficient to complete a welding operation. Actuation by stop members insures closure of circuit only when a stay-wire is in exact position.

The pin-and-slot connection 100 insures that the rod 101 will not be retarded in moving or held in mid-position, and the circuit thus held closed, should the chain 44 be stopped at a point where one of the lugs 58 is in engagement with the left hand edge of the lever 99. Upon engagement by a lug 58 with the lever 99 such lever is first moved in a clockwise direction and then elevated to open the upper contacts and close the lower contacts, as above explained. The circuit remains open until the lug 58 has passed from beneath the lever 99, at which time the rod 101 will fall, as above explained. Should the chain be stopped at that instant, the rod 101 may nevertheless continue to fall and open the lower contacts, notwithstanding the fact that the lever 99 is held against movement in a clockwise direction, by reason of the lost motion connection 100.

The operation of the apparatus is as follows:

The strand-wires 7 having been fed forwardly a sufficient distance, the motor 45 is actuated to drive the chains 44. As the lug 58 (Fig. 2) engages the lever 34, the stay-wires 10 are deposited one-by-one upon the electrode-bars 59 and carried forward to the first set of roller-electrodes 60. The strand-wires 7 are pressed down by said electrodes upon the stay-wires 10 and the secondary circuit is completed (see Fig. 12) through the terminal member 77, brush 75, hub 72, roller 60, strand-wire 7, stay-wire 10 and electrode bar 59 through the wire 10 and a second strand-wire 7, the other electrode 60, brush 81, and terminal 81' of the secondary winding 79. Some current will pass longitudinally through the stay-wires 10 but the current will not pass so freely as through the electrode-bars 59. Those strand-wires 7 which are not welded to the stay-wires 10 by the first set of electrodes, pass beneath the second set of electrodes (Fig. 4) and are welded in the same manner as the other strand wires 7 were welded by the first set of electrodes.

Figure 9:
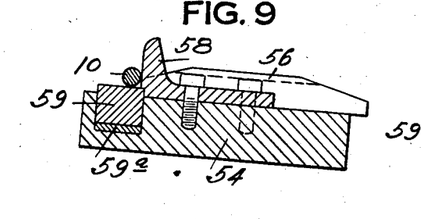
Fig. 9 is an end elevational view of one of the bottom electrodes and the cross-bar upon which it is supported.
Figure 10:
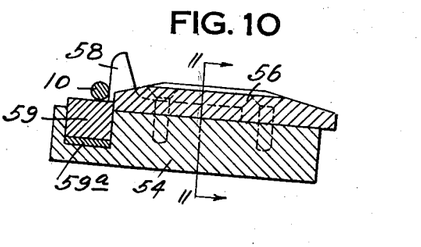
Figs. 10 and 11 are similar views taken at different positions transversely of the machine and showing the manner in which the strand-wires and stay-wires are positioned for welding.
Figure 11:
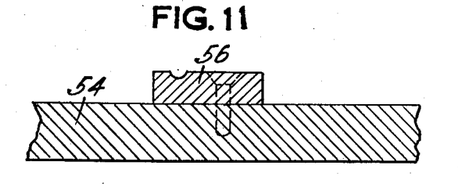

It will be apparent from Fig. 4 that the three pairs of electrodes 62, 63 and 64 are mounted in stepped relation longitudinally of the machine, and that the electrodes 65, 66 and 67 are similarly mounted. The circuit-breaker of Fig. 12 is automatically closed each time a bar-electrode 59 reaches a point beneath a pair of roller-electrodes 60. By the stepped arrangement referred to, the requirement for current is distributed and consumption is not very great at any one time. The staggered relation as between the forward set of electrodes and the rearward set of electrodes (Fig. 4) permits them to be made of sufficient size to operate effectively without excessive crowding. The pairs of electrodes 60 are provided with the compression springs 88 (Fig. 3) so that contact will be assured between each roller-electrode and the wires, notwithstanding irregularities that may arise by reason of the great width of the machine, or otherwise. These springs (88) are adjustable for varying pressures required of different fabrics. The bedplate 5 (Fig. 3) furnishes a rigid support for the bar-electrodes 59, to resist the downward thrust of the electrodes 60. The electrode-bars 59 are grooved slightly as shown in Fig. 9 and are adjustable vertically by reason of the shims 59$^a$ so that the apparatus may operate on wires of different gauge. The grooves in the bars 59 are comparatively shallow but serve to assist the lugs 58 to hold the stay-wires 10 in proper alignment. The peripheries of the electrodes 60 are also grooved slightly, to maintain the strand-wires 7 in proper alignment. The grooves in the electrodes 60 supplement the guiding effect produced by the grooves in the blocks 56 heretofore referred to. The apparatus permits the welding of stay-wires close to their ends, thus reducing the "overhang" and consequent waste.

After the stay-wires 10 have been welded to the strand-wires 7 they serve as means by which the strand-wires 7 are advanced, by reason of the engagement between the lugs 58 and the stay-wires. This arrangement also causes the fabric formed by the welding of the stay-wires 10 and the strand-wires 7, to be forced out of the machine between guide-rollers 128 and 129, from which it passes to a reel or a shearing-table (not shown).

Instead of employing the circuit-breaker of Fig. 12, the circuit may be controlled by a time element device of some other type such as an overload trip device, or a time element relay, it being desirable to apply the current to the wires only for such time as is necessary to complete the weld.

From the foregoing it will be seen that I provide a simple and effective machine wherein the strand-wires are continuously fed, the stay-wires 10 are automatically supplied in timed relation to the movement of the welding apparatus, the wires are placed in proper relation and effectively held against displacement, and the current load is distributed, the electrode-bars are common to all of the roller-electrodes, the number of roller-electrodes may be varied depending upon the width of fabric being manufactured, means are provided to insure localization of welding pressure at each point of weld, and the electrode-bars are adjustable toward and away from the roller-electrodes. The strand and stay-wires are moved by the carrier, in unison, and the circuit-breakers and the feeding mechanisms are also actuated by the carrier, in definite relation to one another and to the movement of the wires, so that synchronism of operations and alignment of the wires and points of weld are assured.

Another advantage present in my invention arises from the fact, that as a stay-wire passes underneath the roller-electrodes a yielding pressure normal to the plane of the weld, is exerted at the exact moment of welding. Means other than the lugs on the carrier may be employed for welding the wires in timed relation to the movement of the carrier, as by various forms of connection to the driving mechanism. It will be apparent that an odd number of strand-wires may be welded by permitting one of the electrodes 60 to run idle, as by omitting to run a strand-wire thereto, and that the spacing between strand-wires may be varied by shifting the roller-electrodes laterally or by omitting to supply strand-wires to only the forward set of electrodes or to certain roller-electrodes. In the latter case, the idle one of a pair of electrodes completes the circuit through its companion electrode by engagement directly with the bars 59.

Furthermore, a double stay-wire construction may be had by arranging the feeding mechanism to drop two wires on the carrier at each operation, instead of a single wire. When welding double stay-wires, the circuit-breaker should be caused to remain closed longer than when welding a single wire. Double strand-wires may be welded by feeding two to each roller-electrode.

While my apparatus as above described employs a circuit-breaker for each pair of welding rolls, it is obvious that a single circuit-breaker could be employed for a plurality of sets of electrodes, and might be dispensed with entirely under some conditions, the circuit through the primary winding of the transformer in that case being unbroken and the circuit through the secondary winding being completed, as above described. Furthermore, my invention is not limited to the welding of wires but may be employed for welding material of any shape.

What I claim is:

1. Electric welding apparatus comprising means for supplying material to be welded, a plurality of electrodes disposed transversely of the path of movement of said material, and spaced longitudinally of said path, and means for supplying current to said electrodes in succession.

2. Electric welding apparatus comprising a carrier for supplying material to be welded, a series of electrodes disposed transversely of said carrier, and a second series of electrodes disposed transversely of said carrier in offset relation with respect to said first series of electrodes.

3. Electric welding apparatus comprising a carrier for material to be welded, a series of electrodes disposed transversely of said carrier, and a series of electrodes disposed in offset relation to said first-named series, the electrodes of each series being also offset with respect to one another.

4. Electric welding apparatus comprising means for supplying a plurality of transversely spaced wires, means for supplying stay wires to be welded to said first-named wires, and means for welding alternate strands of said first-named wires at one portion of the path of movement of said wires, and means for welding the other strands of said first-named wires to said stay wires at another portion of the said path of movement.

5. Electric welding apparatus comprising means for supplying material to be welded at a plurality of points spaced transversely and longitudinally to the path of movement of said material, and means for applying welding heat to said points in succession.

6. Electric welding apparatus comprising a pair of movable electrodes, a carrier for moving material to be welded past said electrodes, a circuit-breaker controlling the supply of current to said electrodes, means on the carrier for actuating said circuit-breaker at predetermined intervals, and means associated with said circuit-breaker for limiting duration of current supply independently of the movement of said electrodes.

7. Electric welding apparatus comprising means for supplying material to be welded, electrode-bars disposed transversely of said material and against the bottom face thereof, and a plurality of electrodes disposed transversely of said material, against the opposite face thereof, and respectively cooperating with said bars, the said electrodes being separately movable toward and from the electrode bars.

8. Electric welding apparatus comprising means for supplying material to be welded, electrode-bars disposed transversely of said material, and a plurality of independently movable electrodes disposed transversely of said material and respectively cooperating with said bars, and means for varying the normal spacing between said bar-electrodes and said pairs of electrodes.

9. Electric welding apparatus comprising a plurality of pairs of electrodes, each electrode of each pair being connected to a terminal of a transformer, a conductor bar cooperating with each of said pairs of electrodes, and means for passing conducting material to be welded between said conductor bar and said pairs of electrodes to complete the circuit through the electrodes, the said pairs of electrodes being spaced at different points longitudinally of the path of movement of said material.

10. Electric welding apparatus comprising a pair of electrodes, a transformer whose secondary winding is in circuit with said electrodes, and means for completing the circuit through the primary winding of said transformer, the said means comprising a switch normally closed and another switch having a two-point break and normally open.

11. Electric welding apparatus comprising a pair of electrodes, a transformer whose secondary winding is in circuit with said electrodes, and means for completing the circuit through the primary winding of said transformer, the said means comprising a switch normally closed and another switch having a two-point break and normally open, together with means for limiting the period of time during which said switches are both closed.

12. The combination with an electric welding machine and a source of current supply therefor, of mechanism for controlling said current supply, comprising a tiltable-member carrying two contacts of a double break switch, and means controlled by movement of said mechanism for actuating said tiltable-member to open and close the circuit.

13. Electric welding apparatus comprising welding electrodes, an inclined carrier to which stay wires are supplied, transversely spaced lugs on said carrier, means for depositing said wires against said lugs for movement past said electrodes, and means actuated by said lugs for controlling the supply of current to said electrodes.

14. Electric welding apparatus comprising welding electrodes, an inclined carrier to which stay wires are supplied, transversely spaced lugs on said carrier, means for depositing said wires against said lugs for movement past said electrodes, and means actuated by said lugs for controlling the supply of current to said electrodes, the said lugs also controlling the supply of said stay wires.

15. Electric welding apparatus comprising a vertically rigid traveling electrode bar, a vertically movable electrode disposed thereabove, and means for feeding material to be welded between said electrode and said bar.

16. Electric welding apparatus comprising a vertically rigid traveling electrode bar, a rotatably mounted, vertically movable electrode disposed above said bar, and means for feeding the material to be welded between said electrode and said bar.

17. Electric welding apparatus comprising a vertically rigid traveling electrode bar, a rotatably mounted, vertically movable electrode disposed above said bar, means for feeding the material to be welded between said electrode and said bar, and means for adjusting the pressure exerted at the point of weld.

18. Electric welding apparatus comprising a vertically movable electrode, a horizontally movable carrier, an electrode bar mounted on said carrier for movement past said first-named electrode, and means for holding a stay wire in welding position upon said bar.

19. Electric welding apparatus comprising a carrier, electrode bars mounted on said carrier, an electrode past which said carrier moves, guides disposed on said carrier in position to pass beneath said electrode, and means for supplying strand wires to said guides.

20. Electric welding apparatus comprising a carrier, electrode bars mounted on said carrier, an electrode past which said carrier moves, longitudinally grooved guides disposed on said carrier in position to pass beneath said electrode, and means for supplying strand wires to said guides.

21. Electric welding apparatus comprising a pair of electrodes, a transformer whose secondary winding is in circuit with said electrodes, means for completing the circuit through the primary winding of said transformer, the said means comprising a switch normally closed and another switch normally open, and means for causing said switches to be simultaneously closed for a predetermined period of time.

22. Electric welding apparatus comprising a pair of electrodes, means for controlling the supply of current to said electrodes, comprising a switch normally closed and another switch normally open, a single actuating member for said switches, and means for limiting the period of time that said actuator will permit both switches to remain simultaneously closed.

In testimony whereof I, the said WILLIAM EDGAR REED, have hereunto set my hand.

WILLIAM EDGAR REED.